US012430963B2

(12) United States Patent
Kato et al.

(10) Patent No.: US 12,430,963 B2
(45) Date of Patent: Sep. 30, 2025

(54) VEHICLE CONTROL SYSTEM AND VEHICLE CONTROL METHOD

(71) Applicant: HONDA MOTOR CO., LTD., Tokyo (JP)

(72) Inventors: Hisahiro Kato, Tokyo (JP); Hiroaki Hakukawa, Tokyo (JP); Noboru Ujigawa, Tokyo (JP); Tomoya Nishino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 18/458,548

(22) Filed: Aug. 30, 2023

(65) Prior Publication Data

US 2024/0104980 A1 Mar. 28, 2024

(30) Foreign Application Priority Data

Sep. 28, 2022 (JP) ................................ 2022-154415

(51) Int. Cl.
*G07C 5/08* (2006.01)

(52) U.S. Cl.
CPC ........... *G07C 5/085* (2013.01); *G07C 5/0816* (2013.01)

(58) Field of Classification Search
CPC ..... G07C 5/085; G07C 5/0816; G07C 5/0808
See application file for complete search history.

(56) References Cited

U.S. PATENT DOCUMENTS

| | | | |
|---|---|---|---|
| 2005/0190469 | A1 | 9/2005 | Noguchi |
| 2015/0367738 | A1 | 12/2015 | Saitou et al. |

FOREIGN PATENT DOCUMENTS

| | | | |
|---|---|---|---|
| CN | 111273176 | A | 6/2020 |
| JP | 2005-241599 | A | 9/2005 |
| JP | 2006-017468 | A | 1/2006 |
| JP | 2006-295345 | A | 10/2006 |
| JP | 2007-213393 | A | 8/2007 |
| JP | 2013-121730 | A | 6/2013 |
| JP | 2016-002944 | A | 1/2016 |
| JP | 2017-114336 | A | 6/2017 |
| JP | 2021-035803 | A | 3/2021 |
| WO | 2007/027702 | A2 | 3/2007 |

OTHER PUBLICATIONS

Machine Translation of JP 2021035803A (Year: 2019).*
Japanese Office Action dated Dec. 12, 2023, Japanese Application No. 2022-154415, 3 pages.

* cited by examiner

*Primary Examiner* — Michael V Kerrigan
(74) *Attorney, Agent, or Firm* — Rankin, Hill & Clark LLP

(57) ABSTRACT

A vehicle control system includes plural electronic control devices each of which controls an operation of a vehicle and which is mounted in the vehicle, a monitoring control device monitoring an operation of each electronic control device, and an electric connector which selectively sets an electronic connection of a power source line constantly performing a supply of power to a connection state or a non-connection state and which is provided between the power source line and each electronic control device, the monitoring control device includes a recording unit which performs a fault diagnosis of one electronic control device being a monitoring target and which executes a recording operation to store a diagnosis result in a storage device, and a mode setting unit setting the recording unit to a first operation mode executing the recording operation or a second operation mode not executing the recording operation.

8 Claims, 7 Drawing Sheets

VEHICLE CONTROL SYSTEM AND VEHICLE CONTROL METHOD

INCORPORATION BY REFERENCE

The present application claims priority under 35 U.S.C. § 119 to Japanese Patent Application No. 2022-154415 filed on Sep. 28, 2022. The content of the application is incorporated herein by reference in its entirety.

BACKGROUND OF THE INVENTION

Field of the Invention

The present invention relates to a vehicle control system and a vehicle control method.

Description of the Related Art

Japanese Patent Laid-Open No. 2021-35803 describes an on-board control device with an objective of suppressing, at low cost, battery exhaustion during a transportation period of a vehicle after manufacture, and when detecting that a prescribed fuse is removed from a prescribed power source line within the vehicle, the on-board control device performs a notification for suppressing current consumption to a vehicle device supplied with power without intervention of the prescribed fuse.

Moreover, Japanese Patent Laid-Open No. 2016-2944 describes a vehicle control system that includes a microcomputer for controlling a first vehicle device group necessary for operating at the time of vehicle transportation, a second vehicle drive group not necessary for operation at the time of transportation, and a transistor switch provided on a power source line for supplying power to the second vehicle device group, the transistor switch is turned off at the time of vehicle transportation, and the transistor switch is turned on at the time of unlocking a vehicle door, by the microcomputer.

Generally, a monitoring control device for performing a fault diagnosis related to a vehicle device is mounted in a vehicle, the monitoring control device being compliant with international standards or the like. For example, the monitoring control device performs communication with a vehicle device at a prescribed timing, the monitoring control device detects whether or not there is no fault in the vehicle device, and in the case where a fault is detected, the monitoring control device stores a code (DTC: Diagnostic Trouble Code) representing the content of this fault in a storage device.

This fault diagnosis function is activated at the time of vehicle manufacture. Accordingly, at the time of vehicle transportation, if a supply of power to a part of the vehicle devices is cut off in order to reduce power consumption of a vehicle battery, the monitoring control device cannot perform communication with these vehicle devices, the monitoring control device determines that these vehicle devices have a fault, and the monitoring control device stores a DTC representing this fault in the storage device.

A DTC stored in such a way is an incorrect record for showing a fault of a vehicle device that is not actually faulty, and this DTC is undesirable since it complicates warehouse inspection at a transportation destination.

The objective of the present invention is, in a vehicle having a fault diagnosis function for an electronic control device of a vehicle, to suppress power consumption of a vehicle battery at the time of vehicle transportation or the like, and to prevent an incorrect fault diagnosis result from being recorded along with the suppression of power consumption.

SUMMARY OF THE INVENTION

One aspect of the present invention is a vehicle control system that includes a plurality of electronic control devices each for controlling an operation of a vehicle, the plurality of electronic control devices each being mounted in the vehicle, a monitoring control device for monitoring an operation of each of the electronic control devices, and an electric connector for selectively setting an electronic connection of a power source line for constantly performing a supply of power to a connection state or a non-connection state, the electric connector being provided between the power source line and each of the plurality of electronic control devices, the monitoring control device includes a recording unit for performing a fault diagnosis of one of the electronic control devices being a monitoring target, the recording unit for executing a recording operation to store a diagnosis result in a storage device, and a mode setting unit for setting the recording unit to a first operation mode or a second operation mode, the first operation mode for executing the recording operation and the second operation mode for not executing the recording operation.

According to another aspect of the present invention, when a shift instruction is received from an external device, the shift instruction for instructing the vehicle to shift to a prescribed specific operation mode, the monitoring control device sets the recording unit to the second operation mode by the mode setting unit, and the monitoring control device shifts to the specific operation mode.

According to another aspect of the present invention, the monitoring control device includes an instruction transmission unit, when receiving the shift instruction from the external device, for transmitting a transition instruction to each of the electronic control devices, the transition instruction showing the fact that the vehicle has been instructed to shift to the specific operation mode, a connection monitoring unit for monitoring whether or not each of the power source lines are in a connection state by the electric connector, and an HMI control unit for controlling an HMI device mounted in the vehicle, in a case where a power source switch of the vehicle has been turned on during a time period when the monitoring control device is shifting to the specific operation mode, and when the connection monitoring unit determines that all of the power source lines are in a non-connection state by the electric connector, the HMI control unit outputs a notification to inside the vehicle by the HMI device, the notification being the fact that the vehicle is operating in the specific operation mode.

According to another aspect of the present invention, in a case where a power source switch of the vehicle has been turned on during a time period when the monitoring control device is shifting to the specific operation mode, and when the connection monitoring unit determines that all of the power source lines are in a connection state by the electric connector, the mode setting unit sets the recording unit to the first operation mode, and the instruction transmission unit transmits a release instruction to each of the electronic control devices, the release instruction for instructing a release of the transition instruction.

According to another aspect of the present invention, in a case where a power source switch of the vehicle has been turned on during a time period when the monitoring control device is shifting to the specific operation mode, and when the connection monitoring unit determines that all of the power source lines are in a connection state by the electric connector, the HMI control unit waits for an acknowledgement input to be received through the HMI device, the acknowledgement input for ending the specific operation mode, and in response to the acknowledgement input being received through the HMI device, the mode setting unit sets the recording unit to the first operation mode, and the instruction transmission unit transmits a release notification of the transition instruction to the electronic control device.

According to another aspect of the present invention, each of the plurality of electronic control devices includes a first electronic control device for receiving a supply of power from a power supply line directly wired to the power source line without intervention of the electric connector, the first electronic control device for continuing an operation in a power saving mode after the electric connector sets the power source line to a non-connection state, and a second electronic control device, when the electric connector sets the power source line to a non-connection state, being in a non-operation state by losing a supply of power.

According to another aspect of the present invention, the monitoring control device includes an instruction transmission unit, when receiving a shift instruction from an external device, the shift instruction for instructing the vehicle to shift to a prescribed specific operation mode, for transmitting a transition instruction to the electronic control device, the transition instruction showing the fact that the vehicle has been instructed to shift to the specific operation mode, the first electronic control device includes an operation setting unit for setting an operation mode of the first electronic control device, when a power source switch of the vehicle has been turned off when not receiving the transition instruction or when the transition instruction is released, the operation setting unit sets the first electronic control device to a first power saving mode, and when the power source switch has been turned off from when receiving the transition instruction until the transition instruction is released, the operation setting unit sets the first electronic control device to a second power saving mode with a lower power consumption than power consumption of the first power saving mode.

Another aspect of the present invention is a vehicle control method executed by a vehicle control system including a plurality of electronic control devices each for controlling an operation of a vehicle, the plurality of electronic control devices each being mounted in the vehicle, a monitoring control device for monitoring an operation of each of the electronic control devices, and an electric connector for selectively setting an electronic connection of a power source line for constantly performing a supply of power to a connection state or a non-connection state, the electric connector being provided between the power source line and each of the plurality of electronic control devices, the vehicle control method including a step performed by a computer included in the monitoring control device, the step for setting a recording unit to a first operation mode or a second operation mode, the recording unit for performing a fault diagnosis of one of the electronic control devices being a monitoring target, the recording unit for executing a recording operation to store a diagnosis result in a storage device, and the first operation mode for executing the recording operation and the second operation mode for not executing the recording operation.

According to the present invention, in a vehicle having a fault diagnosis function for an electronic control device of a vehicle, power consumption of a vehicle battery at the time of vehicle transportation or the like is suppressed, and an incorrect fault diagnosis result is prevented from being recorded along with the suppression of power consumption.

DETAILED DESCRIPTION OF THE PREFERRED EMBODIMENTS

Hereinafter, embodiments of the present invention will be described by referring to the figures.

Figure 1:
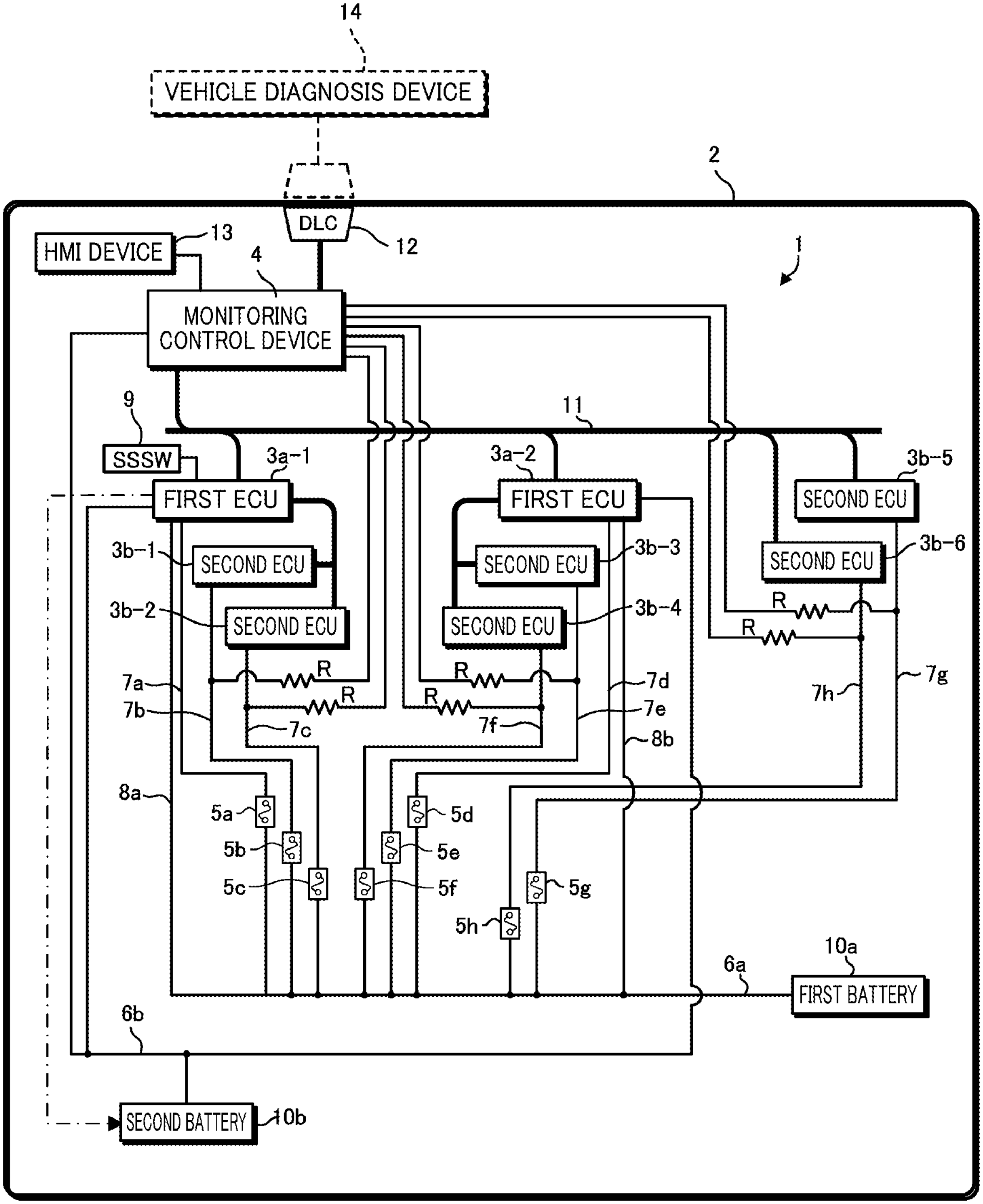
FIG. 1 is a figure showing a vehicle control system according to an embodiment of the present invention.

FIG. 1 is a figure showing a configuration of a vehicle control system 1 according to an embodiment of the present invention.

The vehicle control system 1 includes first ECUs 3*a*-1, 3*a*-2 and second ECUs 3*b*-1, 3*b*-2, 3*b*-3, 3*b*-4, 3*b*-5, 3*b*-6, the first ECUs and second ECUs being mounted in a vehicle 2, and the first ECUs and second ECUs being a plurality of electronic control devices for controlling operations of the vehicle 2. Each of the first ECUs 3*a*-1, 3*a*-2 and the second ECUs 3*b*-1, 3*b*-2, 3*b*-3, 3*b*-4, 3*b*-5, 3*b*-6 operate so as to implement different prescribed functions of the vehicle 2, individually or with a part of the ECUs working in cooperation.

The vehicle control system 1 also includes power supply lines 7*a*, 7*b*, 7*c*, 7*d*, 7*e*, 7*f*, 7*g*, 7*h* connecting the first ECUs 3*a*-1, 3*a*-2 and the second ECUs 3*b*-1, 3*b*-2, 3*b*-3, 3*b*-4, 3*b*-5, 3*b*-6 to a power source line 6*a* of the vehicle 2, and backup fuses 5*a*, 5*b*, 5*c*, 5*d*, 5*e*, 5*f*, 5*g*, 5*h* attachably and detachably provided on each of these power supply lines 7*a*, 7*b*, 7*c*, 7*d*, 7*e*, 7*f*, 7*g*, 7*h*. The power source line 6*a* is connected to a first battery 10*a*, and the power source line 6*a* constantly performs a supply of power.

Hereinafter, the first ECUs 3*a*-1, 3*a*-2 and the second ECUs 3*b*-1, 3*b*-2, 3*b*-3, 3*b*-4, 3*b*-5, 3*b*-6 will also be collectively called the electronic control devices 3. Moreover, the power supply lines 7*a*, 7*b*, 7*c*, 7*d*, 7*e*, 7*f*, 7*g*, 7*h* will also be collectively called the power supply lines 7, and the backup fuses 5*a*, 5*b*, Sc, 5*d*, 5*e*, 5*f*, 5*g*, 5*h* will also be collectively called the backup fuses 5. Here, in the present disclosure, each of the backup fuses 5 is provided between each of the power supply lines 7 and each of the plurality of electronic control devices, each of the power supply lines 7 being a power source line for constantly performing a supply of power, and each of the backup fuses 5 corresponds to an electric connector for selectively setting an electronic connection of the power source line to a connection state or a non-connection state.

For example, each of the backup fuses 5 is removed in the case where the vehicle 2 is transported from a production plant to a sales shop or maintenance factory, and each of the backup fuses 5 is attached again when the vehicle 2 arrives at the sales shop or maintenance factory. In this way, a charging amount of the first battery 10*a* can be prevented from being consumed during transportation, by dark current that can flow in each of the electronic control devices 3 at the time when each of the electronic control devices 3 is turned off during transportation.

The first ECUs 3*a*-1 and 3*a*-2 each receive a supply of power by the power supply lines 7*a* and 7*b* wired to the power source line 6*a* through the backup fuses 5*a* and 5*d*, the first ECUs 3*a*-1 and 3*a*-2 each receive a supply of power from power supply lines 8*a* and 8*b* directly connected to the power source line 6*a* without intervention of the backup fuses 5*a* and 5*d*, and the first ECUs 3*a*-1 and 3*a*-2 can each continue to operate in a power saving mode after the backup fuses 5*a* and 5*b* are removed. Hereinafter, the power supply lines 8*a* and 8*b* will also be collectively called the power supply lines 8.

In this way, in the first ECUs 3*a*-1 and 3*a*-2, when each of the backup fuses 5 is removed at the time of transportation of the vehicle 2, for example, power consumption of the first battery 10*a* can be suppressed by limiting the execution of one part of the functions having a high power consumption, and the limited functions of the other part can be operated.

A communication function with a monitoring control device 4, which will be described below, is included in the one part of the functions, execution of the one part of the functions being limited in the first ECUs 3*a*-1 and 3*a*-2 when each of the backup fuses 5 is removed.

Moreover, for example, when a Start-Stop Switch (SSSW) 9 has been turned on, the SSSW 9 being a power source switch of the vehicle 2, the first ECU 3*a*-1 performs an activation process of the second battery 10*b*, as a function of the other part operable when each of the backup fuse 5 is removed. The second battery 10*b* starts a supply of power by the activation process, and when the SSSW 9 has been turned off, the second battery 10*b* ends a supply of power by a stop process performed by the first ECU 3*a*-1. In this way, in the vehicle control system 1, after each of the backup fuses 5 is removed, an on/off operation of the SSSW 9 performed for the vehicle 2 is detected, and an output of a specific mode execution notification, which will be described below, or the like can be performed. Therefore, the vehicle convenience for a vehicle inspection staff or the like is improved.

The second battery 10*b* supplies power to the monitoring control device 4 and the first ECUs 3*a*-1 and 3*a*-2, through the power source line 6*b*.

Here, each of the first ECUs 3*a*-1 and 3*a*-2 corresponds to a first electronic control device in the present disclosure. Hereinafter, the first ECUs 3*a*-1 and 3*a*-2 will also be collectively called the first ECUs 3*a*.

On the other hand, since the second ECUs 3*b*-1, 3*b*-2, 3*b*-3, 3*b*-4, 3*b*-5, 3*b*-6 receive a supply of power only from each of the power supply lines 7 on which the backup fuses 5 are provided, the second ECUs 3*b*-1, 3*b*-2, 3*b*-3, 3*b*-4, 3*b*-5, 3*b*-6 do not operate in the case where the backup fuses 5*b*, 5*c*, 5*e*, 5*f*, 5*g*, 5*h* are removed. In this way, since the second ECUs 3*b*-1, 3*b*-2, 3*b*-3, 3*b*-4, 3*b*-5, 3*b*-6 no longer consume dark current if each of the backup fuses 5 is removed at the time of transportation of the vehicle 2, wasteful power consumption of the first battery 10*a* is prevented.

Here, each of the second ECUs 3*b*-1, 3*b*-2, 3*b*-3, 3*b*-4, 3*b*-5, 3*b*-6 corresponds to a second electronic control device in the present disclosure. Hereinafter, the second ECUs 3*b*-1, 3*b*-2, 3*b*-3, 3*b*-4, 3*b*-5, 3*b*-6 will also be collectively called the second ECUs 3*b*.

Namely, the electronic control devices 3 include each of the first ECUs 3*a* and each of the second ECUs 3*b*, each of the first ECUs 3*a* being a first electronic control device and each of the second ECUs 3*b* being a second electronic control device.

The vehicle control system 1 also includes a monitoring control device 4.

The monitoring control device 4 communicates with each of the first ECUs 3*a* and the second ECUs 3*b*-1, 3*b*-2 through a communication bus 11 constituting a vehicle communication network. Moreover, the monitoring control device 4 can communicate with the second ECUs 3*b*-1 and 3*b*-2 communicably connected with the first ECU 3*a*-1, and the monitoring control device 4 can communicate with the second ECUs 3*b*-3 and 3*b*-4 communicably connected with the first ECU 3*a*-2, through the first ECUs 3*a*-1 and 3*a*-2.

The monitoring control device 4 also has a fault diagnosis function related to each of the electronic control devices 3. The monitoring control device 4 communicates with each of the electronic control devices 3, for example, in a prescribed time interval, and the monitoring control device 4 performs a fault diagnosis related to each of the electronic control devices 3. Also, in the case where a fault is discovered for any one of the electronic control devices 3, the monitoring control device 4 stores a DTC representing the content of this fault in a storage device.

Moreover, the monitoring control device 4 acquires, from each of the electronic control devices 3, connection information for whether or not each of the backup fuses 5 of each of the power supply lines 7 connected to each of the electronic control devices 3 are mounted, and whether or not each of the power supply lines 7 are in a connection state.

In the case where each of the backup fuses 5 is removed, each of the first ECUs 3*a*, from among the electronic control devices 3, can transmit connection information to the monitoring control device 4, by a supply of power from each of the power supply lines 8.

On the other hand, in the case where each of the backup fuses 5 is removed, since each of the second ECUs 3*b* stops operation, each of the second ECUs 3*b* cannot transmit connection information to the monitoring control device 4. Accordingly, when connection information cannot be obtained from each of the second ECUs 3*b* by an operation stoppage of each of the second ECUs 3*b*, the monitoring control device 4 acquires a voltage value of each of the power supply lines 7 connected to each of the second ECUs 3*b*, through a protective resistor R, and the monitoring control device 4 detects, from the acquired voltage value, whether or not each of the backup fuses 5 of each of the power supply lines 7 connected to each of the second ECUs 3*b* is mounted.

The monitoring control device 4 is connected to a Human-Machine Interface (HMI) device 13 mounted in the vehicle 2, the monitoring control device 4 outputs information to a vehicle compartment of the vehicle 2 through the HMI device 13, and the monitoring control device 4 receives information or instructions through the HMI device 13. The HMI device 13 can include a touch panel, speaker, and/or microphone mounted in the vehicle 2.

Moreover, a vehicle diagnosis device 14 is connected to the monitoring control device 4, from outside the vehicle 2, the vehicle diagnosis device 14 being an external device through a Data Link Connector (DLC) 12. In the present embodiment, the vehicle diagnosis device 14 transmits a shift instruction to the monitoring control device 4, the shift instruction for instructing the vehicle 2 to shift to a prescribed specific operation mode. In the present embodiment, the specific operation mode is a transportation mode for setting the vehicle 2 to a prescribed state suitable for transportation, at the time of transportation of the vehicle 2.

Next, a configuration of the monitoring control device 4 will be described.

Figure 2:
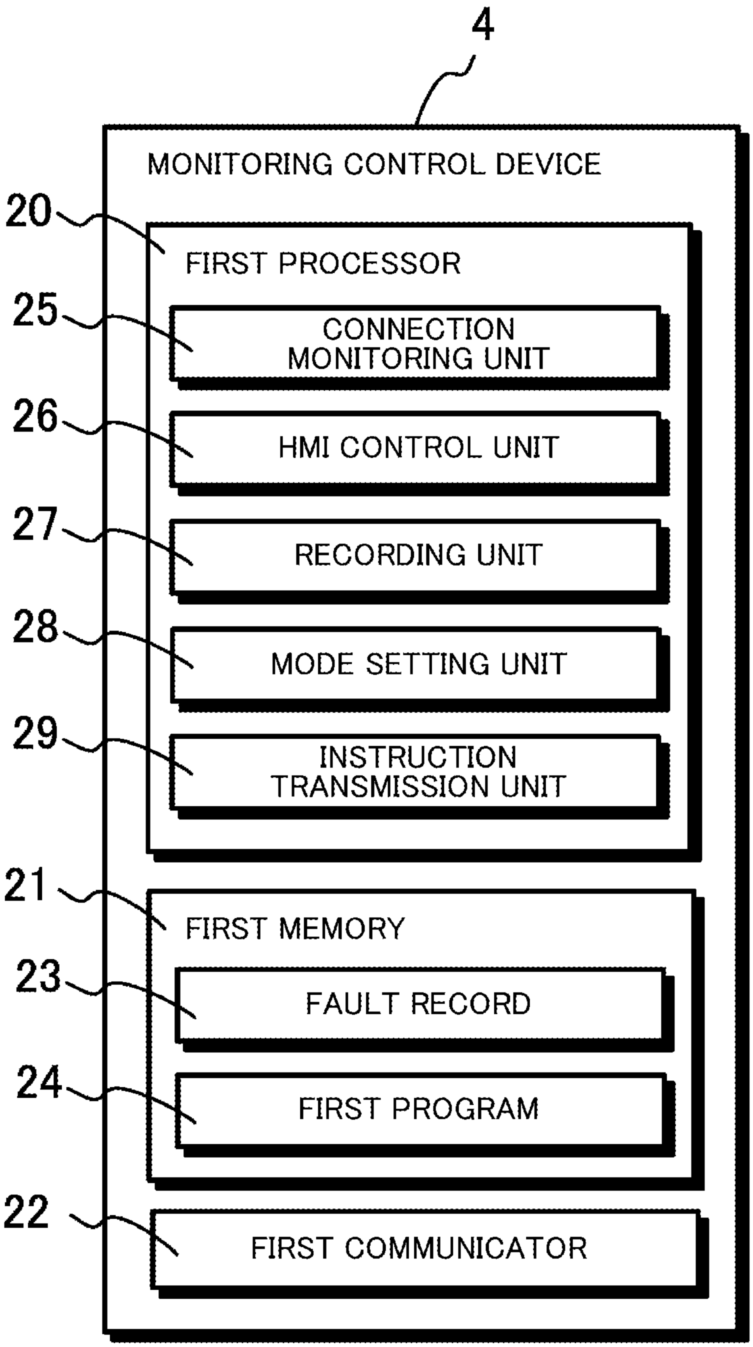
FIG. 2 is a figure showing a configuration of a monitoring control device.

FIG. 2 is a figure showing a configuration of the monitoring control device 4. The monitoring control device 4 has a first processor 20, a first memory 21, and a first communicator 22. The first memory 21 is constituted, for example, of a volatile or nonvolatile semiconductor memory and/or a hard disk device or the like. A fault record 23 is stored in the first memory 21, by a recording unit 27, which will be described below, the fault record 23 being a history of fault diagnosis results for each of the electronic control devices 3. A DLC is included in the fault record 23, the DLC showing the content of a fault discovered for one of the electronic control devices 3. The first communicator 22 is a transmitter/receiver for the monitoring control device 4 to communicate with vehicle devices such as each of the first ECUs 3*a*, each of the second ECUs 3*b*, and the HMI device 13, and for the monitoring control device 4 to communicate with the vehicle diagnosis device 14.

The first processor 20 is, for example, a computer that includes a CPU or the like. The first processor 20 may be constituted by having a ROM to which programs a written, and a RAM for temporary storage of data. Also, the first processor 20 includes a connection monitoring unit 25, an HMI control unit 26, a recording unit 27, a mode setting unit 28, and an instruction transmission unit 29, as functional elements or functional units.

These functional elements included in the first processor 20 are implemented, for example, by the first processor 20 that is a computer, the first processor 20 executing a first program 24 stored in the first memory 21. Note that the first program 24 can be stored in an arbitrary computer-readable storage medium. Instead of the above description, all or part of the functional elements included in the first processor 20 can be respectively constituted of hardware including one or more electronic circuit components.

The connection monitoring unit 25 monitors whether or not each of the backup fuses 5 is mounted. Specifically, the connection monitoring unit 25 determines whether or not each of the backup fuses 5 provided on each of the power supply lines 7 of each of the electronic control devices 3 is mounted, by having the connection monitoring unit 25 receive connection information that is information for whether or not each of the backup fuses 5 is mounted and information for whether or not each of the power supply lines 7 is in a connection state, the connection information being transmitted from each of the electronic control devices 3.

When each of the second ECUs 3*b* stops operation, and connection information cannot be obtained from each of the second ECUs 3*b*, the connection monitoring unit 25 determines whether or not each of the backup fuses 5 of each of the power supply lines 7 is removed, based on a voltage value acquired from each of the power supply lines 7 connected to each of the second ECUs 3*b* through each of the protective resistors R. For example, in a time period when the monitoring control device 4 is shifting to the specific operation mode (namely, a time period when the recording unit 27 is set to a second operation mode by a mode setting unit 28, which will be described below), the connection monitoring unit 25 determines whether or not each of the backup fuses 5 of each of the power supply lines 7 of each of the second ECUs 3*b* is removed, based on the voltage value acquired through each of the protective resistors R.

The HMI control unit 26 controls the HMI device 13 mounted in the vehicle 2. In the case where the SSSW 9 has been turned on after the instruction transmission unit 29 has transmitted a transition instruction to each of the electronic control devices 3, and when the connection monitoring unit 25 determines that at least part of the backup fuses 5 are mounted, the HMI control unit 26 outputs a removal instruction from the HMI device 13, the removal instruction for instructing removal of the part of the backup fuses 5. The removal instruction can be an output of a text message or an output of a voice message, such as "please remove the backup fuses", from the touch panel that is the HMI device 13 and/or the speaker that is the HMI device 13.

Moreover, in the case where the SSSW 9 has been turned on in the time period when the monitoring control device 4 is shifting to the specific operation mode, and when the connection monitoring unit 25 determines that all of the backup fuses are not mounted, the HMI control unit 26 outputs a specific mode execution notification to the vehicle compartment of the vehicle 2, the specific mode execution notification being the fact that the vehicle 2 is operating in the specific operation mode. The specific mode execution notification can be, for example, a display of a text message or an output of a voice message, such as "in a transportation mode", from the touch panel that is the HMI device 13 and/or the speaker that is the HMI device 13. In this way, in the vehicle control system 1, a vehicle transportation worker or the like can easily know that the vehicle 2 is in the specific operation mode in which each of the backup fuses 5 is removed, power consumption is reduced, and a fault diagnosis result is not recorded.

Moreover, in the case where the SSSW 9 has been turned on in a time period when the monitoring control device 4 is shifting to the specific operation mode, and when the connection monitoring unit 25 determines that all of the backup fuses are mounted, the HMI control unit 26 outputs a message of an acknowledgement request by the HMI device 13, the acknowledgement request being an inquiry as to whether or not the specific operation mode may end, and the HMI control unit 26 waits for an acknowledgement input to be performed for the HMI device 13, the acknowledgement input being the fact that the specific operation mode is finished. When an acknowledgement input is performed for the HMI device 13, the HMI control unit 26 receives this acknowledgement input. The message of the acknowledgement request can be a display of a text message or an output of a voice message, such as "is it ok to finish the transportation mode?", from the touch panel that is the HMI device 13 or the speaker that is the HMI device 13. Moreover, the acknowledgement input can be an operation input to the touch panel that is the HMI device 13 (for example, a touch operation to a button displayed on the touch panel) and/or the acknowledgement input can be a voice instruction received from the microphone that is the HMI device 13.

The recording unit 27 performs a fault diagnosis of one of the electronic control devices 3 being a monitoring target, and the recording unit 27 executes a recording operation to store the diagnosis result in the first memory 21. Specifically, the recording unit 27 communicates with each of the electronic control devices 3, in a prescribed time interval, for example, and the recording unit 27 performs a fault diagnosis related to each of the electronic control devices 3. Also, in the case where a fault is discovered for any one of the electronic control devices 3, the recording unit 27 saves a DTC representing the content of this fault in the fault record 23, the fault record 23 being stored in the first memory 21.

In the present embodiment, specifically, the recording unit 27 executes the recording operation when set to a first operation mode by the mode setting unit 28, and the recording unit 27 does not execute the recording operation when set to a second operation mode by the mode setting unit 28.

The mode setting unit 28 sets the recording unit 27 to the first operation mode or the second operation mode, the first operation mode for executing the recording operation and the second operation mode for not executing the recording operation. In this way, in the vehicle control system 1, since the recording unit 27 can be set to the second operation mode at the time of vehicle transportation, for example, power consumption of the first battery 10*a* can be suppressed at the time of transportation or the like, and an incorrect fault diagnosis result can be prevented from being recorded for each of the electronic control devices 3 along with the suppression of power consumption.

Specifically, when the monitoring control device 4 receives a shift instruction from the vehicle diagnosis device 14 that is an external device, the shift instruction for instructing the vehicle 2 to shift to the specific operation mode, the mode setting unit 28 sets the recording unit 27 to the second operation mode. The monitoring control device 4 shifts to the specific operation mode, by having the recording unit 27 set to the second operation mode by the mode setting unit 28. As stated above, the specific operation mode, for example, is a transportation mode for setting the vehicle 2 to a prescribed state suitable for transportation at the time of transportation of the vehicle 2.

In this way, in the vehicle control system 1, a recording operation of an incorrect fault diagnosis result can be easily prevented, by an instruction from an external device such as the vehicle diagnosis device 14.

Moreover, in the case where the SSSW 9 has been turned on in a time period when the monitoring control device 4 is shifting to the specific operation mode, and when the connection monitoring unit determines that all of the backup fuses are mounted, the mode setting unit 28 sets the recording unit 27 to the first operation mode, in response to the HMI control unit 26 receiving an acknowledgement input through the HMI device 13. The monitoring control device 4 returns to the normal mode, by having the recording unit 27 set to the first operation mode by the mode setting unit 28.

In this way, for example, since the recording unit 27 does not return to the first operation mode until a maintenance staff or the like of the vehicle 2 performs an acknowledgement input, an incorrect fault diagnosis result can be prevented from being carelessly recorded before maintenance after transportation or the like is completed.

Instead of the above description, in the case where the SSSW 9 has been turned on in a time period when the monitoring control device 4 is shifting to the specific operation mode, and when the connection monitoring unit 25 determines that all of the backup fuses 5 are mounted, the mode setting unit 28 may set the recording unit 27 to the first operation mode. In this way, since the recording unit 27 is automatically returned to the first operation mode, by attaching all of the backup fuses 5 and turning on the SSSW 9, for example, after ending vehicle transportation, the work becomes easy.

When the instruction transmission unit 29 receives a shift instruction received from the vehicle diagnosis device 14, the instruction transmission unit 29 transmits a transition instruction to each of the electronic control devices 3, the transition instruction showing the fact that the vehicle 2 has been instructed to shift to the specific operation mode. For example, the instruction transmission unit 29 may transmit the shift instruction received from the vehicle diagnosis device 14 as the transition instruction as it is, or the instruction transmission unit 29 may transmit a transition instruction different from the shift instruction. For example, the transition instruction can include a code different from the shift instruction and/or additional instructions or content not included in the shift instruction.

Moreover, in response to an acknowledgement input being received by the HMI control unit 26 through the HMI device 13, the instruction transmission unit 29 transmits a release instruction to each of the electronic control devices 3, the release instruction for instructing a release of the transition instruction. In this way, for example, since the vehicle 2 does not return to the normal mode until a maintenance staff or the like of the vehicle 2 performs an acknowledgement input, the vehicle 2 can be prevented from carelessly returning to the normal mode before maintenance after transportation or the like is completed.

Alternatively, in the case where the SSSW 9 has been turned on in a time period when the monitoring control device 4 is shifting to the specific operation mode, and when the connection monitoring unit 25 determines that all of the backup fuses 5 are mounted, the instruction transmission unit 29 may transmit a release instruction to each of the electronic control devices 3. In this case, it is not necessary for the HMI control unit 26 to receive an acknowledgement input though the HMI device 13. In this way, since the vehicle can be automatically returned to a normal operation mode, by attaching all of the backup fuses 5 and turning on the SSSW 9, for example, after ending vehicle transportation, the work becomes easy.

Figure 3:
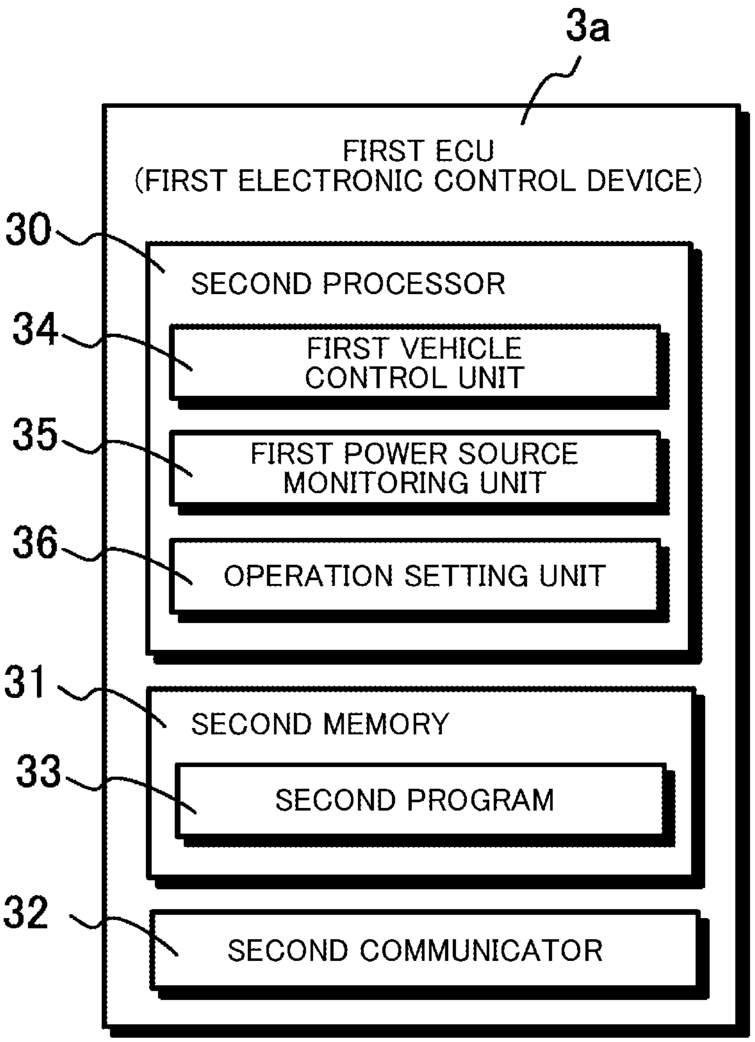
FIG. 3 is a figure showing a configuration of a first ECU (first electronic control device)

FIG. 3 is a figure showing a configuration of one of the first ECUs 3*a* that is a first electronic control device.

Each of the first ECUs 3*a* has a second processor 30, a second memory 31, and a second communicator 32. The second memory 31 is constituted, for example, of a volatile or nonvolatile semiconductor memory and/or a hard disk device or the like. The second communicator 32 is a transmitter/receiver for the first ECU 3*a* to communicate with vehicle devices such as the monitoring control device 4 and each of the second ECUs 3*b*.

The second processor 30 is, for example, a computer that includes a CPU or the like. The second processor 30 may be constituted by having a ROM to which programs a written, and a RAM for temporary storage of data. Also, the second processor 30 includes a first vehicle control unit 34, a first power source monitoring unit 35, and an operation setting unit 36, as functional elements or functional units.

These functional elements included in the second processor 30 are implemented, for example, by the second processor 30 that is a computer, the second processor 30 executing a second program 33 stored in the second memory 31. Note that the second program 33 can be stored in an arbitrary computer-readable storage medium. Instead of the above description, all or part of the functional elements included in the second processor 30 can be respectively constituted of hardware including one or more electronic circuit components.

The first vehicle control unit 34 executes control operations for implementing arbitrary vehicle functions provided to each of the first ECUs 3*a*. For example, in the case of the first ECU 3*a*-1, executing an activation process for causing the second battery 10*b* to start a supply of power, by detecting that the SSSW 9 has been turned on, and executing a stop process for causing the second battery 10*b* to stop a supply of power, by detecting that the SSSW 9 has been turned off, are included in the control operations.

The first power source monitoring unit 35 detects whether or not each of the backup fuses 5 is mounted on each of the power supply lines 7, based on a voltage value of each of the power supply lines 7 connected to each of the first ECUs 3*a*. When a transition instruction is received from the monitoring control device 4, or when the SSSW 9 has been turned on during a time period from when a transition instruction is received from the monitoring control device 4 until the transition instruction is released, and each of the first ECUs 3*a* is operating in the normal mode, the first power source monitoring unit 35 performs a determination of mounting presence/absence of each of the backup fuses 5, and the first power source monitoring unit 35 transmits connection information to the monitoring control device 4, the connection information showing this determination result.

The operation setting unit 36 switches the operation mode of each of the first ECUs 3*a* between the normal mode and the power saving mode. In the present embodiment, in particular, when a transition instruction is not received from the monitoring control device 4, or when the SSSW 9 has been turned off while a transition instruction is released (namely, after a release instruction is received from the monitoring control device 4), the operation setting unit 36 sets each of the first ECUs 3*a* to a first power saving mode. Moreover, when the SSSW 9 has been turned off in a time period from when a transition instruction is received from the monitoring control device 4 until the transition instruction is released, the operation setting unit 36 sets each of the first ECUs 3*a* to a second power saving mode with a lower power consumption than power consumption of the first power saving mode. In this way, when each of the backup fuses 5 is removed, since power consumption in a power saving mode of each of the first ECUs 3*a* is reduced more than power consumption prior to each of the backup fuses 5 being removed, power consumption of the vehicle 2 can be reduced in the specific operation mode.

In the first power saving mode and the second power saving mode, part of the operations of the first vehicle control unit 34 are limited. In the second power saving mode, the first vehicle control unit 34 causes a larger number of functions to be limited than the number of functions limited in the first power saving mode, and the first vehicle control unit 34 causes power consumption of each of the first ECUs 3*a* to be reduced. Here, in the first ECU 3*a*-1, the above-stated activation process is not limited, in either one of the first power saving mode and the second power saving mode.

Figure 4:
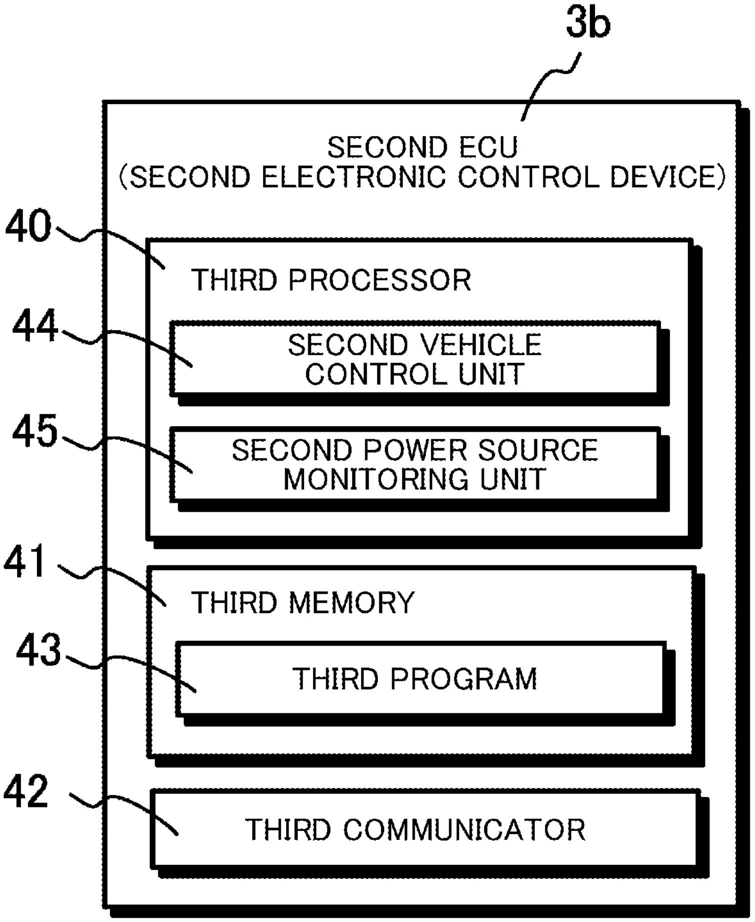
FIG. 4 is a figure showing a configuration of a second ECU (second electronic control device)

FIG. 4 is a figure showing a configuration of one of the second ECUs 3*b* that is a second electronic control device.

Each of the second ECUs 3*b* has a third processor 40, a third memory 41, and a third communicator 42. The third memory 41 is constituted, for example, of a volatile or nonvolatile semiconductor memory and/or a hard disk device or the like. The third communicator 42 is a transmitter/receiver for the second ECU 3*b* to communicate with vehicle devices such as the monitoring control device 4 and each of the first ECUs 3*a*.

The third processor 40 is, for example, a computer that includes a CPU or the like. The third processor 40 may be constituted by having a ROM to which programs a written, and a RAM for temporary storage of data. Also, the third processor 40 includes a second vehicle control unit 44 and a second power source monitoring unit 45, as functional elements or functional units.

These functional elements included in the third processor 40 are implemented, for example, by the third processor 40 that is a computer, the third processor 40 executing a third program 43 stored in the third memory 41. Note that the third program 43 can be stored in an arbitrary computer-readable storage medium. Instead of the above description, all or part of the functional elements included in the third processor 40 can be respectively constituted of hardware including one or more electronic circuit components.

The second vehicle control unit 44 executes control operations for implementing arbitrary vehicle functions provided to each of the second ECUs 3*b*. For example, when an operation request is received from another vehicle device, the second vehicle control unit 44 returns to the normal mode from the power saving mode, and when the requested operation is completed, the second vehicle control unit 44 shifts to the power saving mode.

The second power source monitoring unit 45 detects whether or not each of the backup fuses 5 is mounted on each of the power supply lines 7, based on a voltage value of each of the power supply lines 7 connected to each of the second ECUs 3*b*. When a transition instruction is received from the monitoring control device 4, or a supply of power from each of the power supply lines 7 returns during a time period from when a transition instruction is received from the monitoring control device 4 until the transition instruction is released, the second power source monitoring unit 45 performs a determination of mounting presence/absence of each of the backup fuses 5, and the second power source monitoring unit 45 transmits connection information to the monitoring control device 4, the connection information showing this determination result. Transmission of the determination of mounting presence/absence and the connection information is executed while the second ECU 3*b* is operating in the power saving mode.

Next, a procedure of the operations of the vehicle control system 1 will be described.

Figure 5:
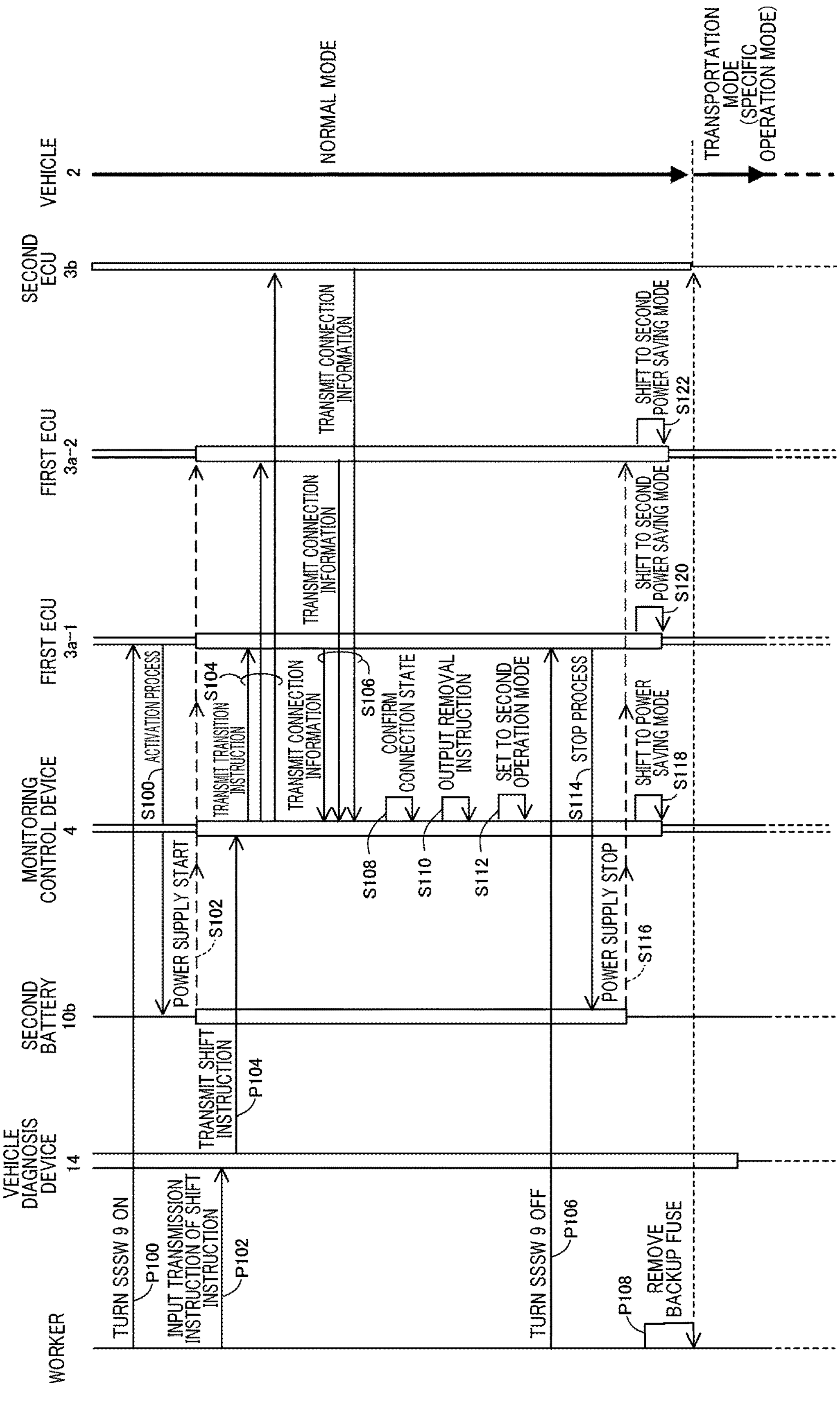
FIG. 5 is a figure showing a procedure of processes of a vehicle control method when a vehicle is shifted from a normal mode to a specific operation mode.
Figure 6:
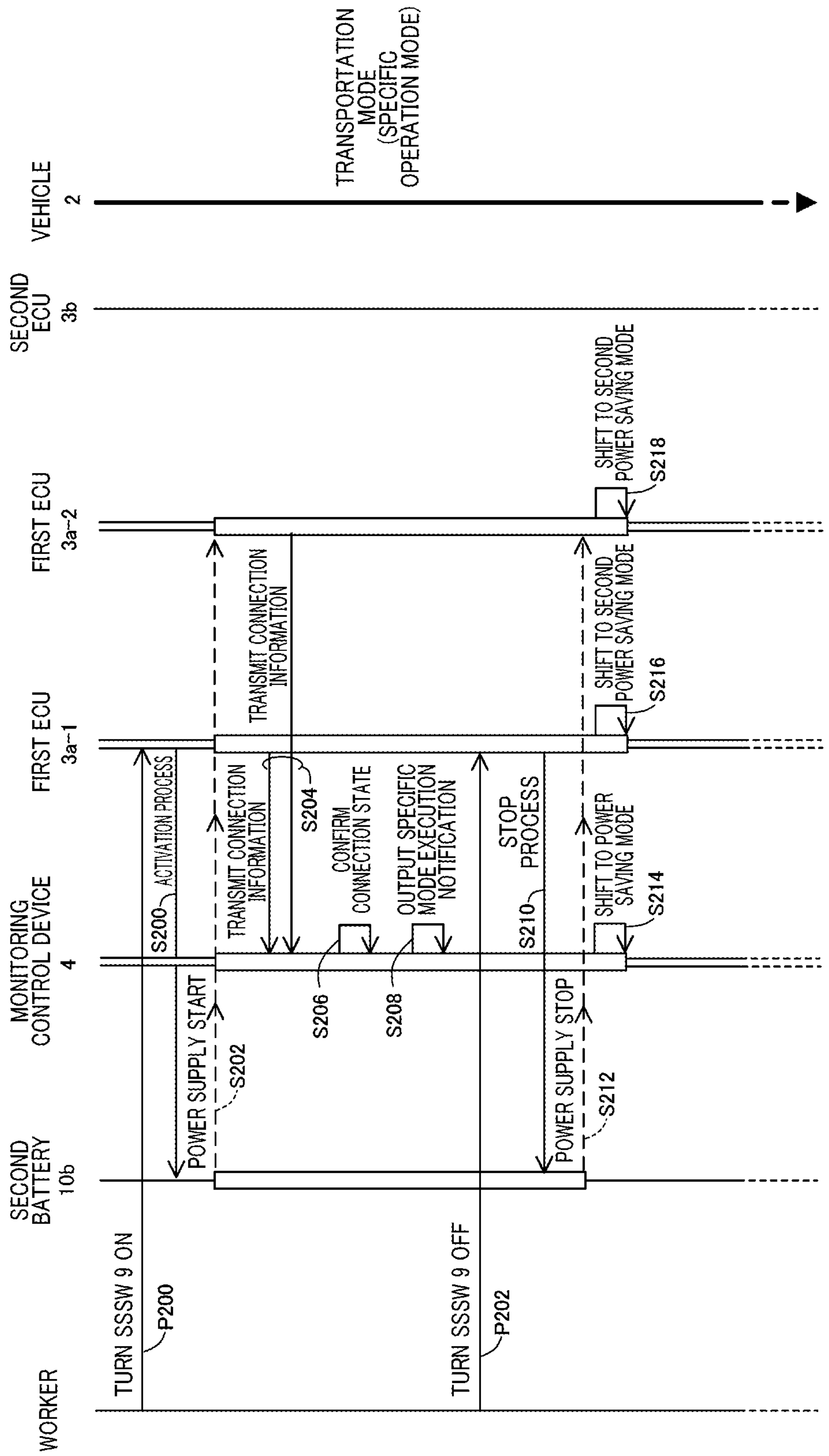
FIG. 6 is a figure showing a procedure of processes of a vehicle control method in a specific operation mode.
Figure 7:
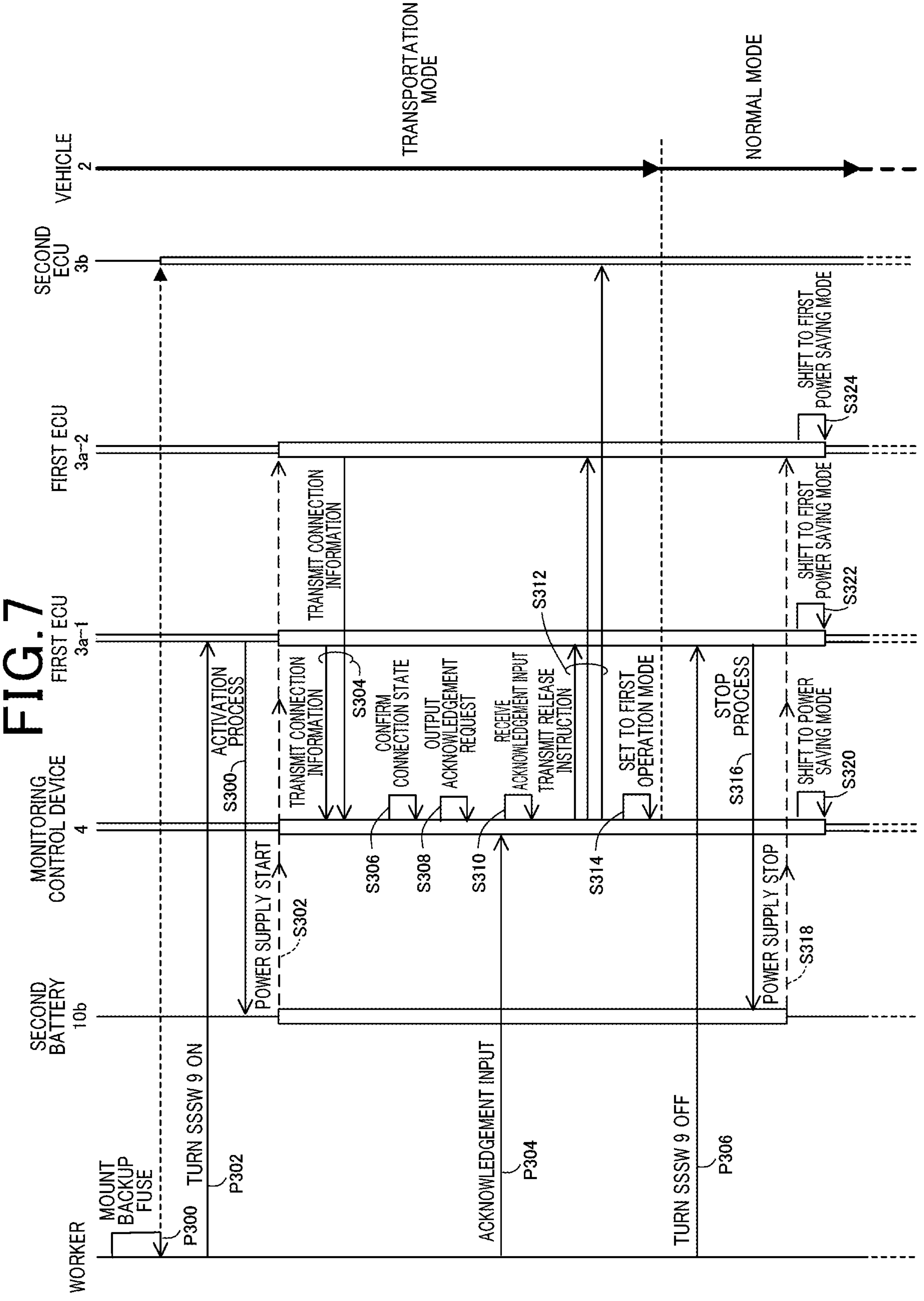
FIG. 7 is a figure showing a procedure of processes of a vehicle control method when a vehicle is returned to a normal mode from a specific operation mode.

Each of FIG. 5, FIG. 6, and FIG. 7 is a sequence diagram showing a procedure of the processes of a vehicle control method implemented by the first processor 20 of the monitoring control device 4, the second processor 30 of each of the first ECUs 3*a*, and the third processor 40 of each of the second ECUs 3*b*, the first processor 20, the second processor 30, and the third processor 40 being computers included in the vehicle control system 1. The processes shown by reference characters starting with the character S in FIG. 5, FIG. 6, and FIG. 7 correspond to processes in the vehicle control method. The processes shown by reference characters starting with the character P show processes in the vehicle diagnosis device 14, the vehicle diagnosis device 14 being the work of a person (worker) additionally shown for ease of understanding, or the vehicle diagnosis device 14 being an external device, and the processes shown by reference characters staring with the character P are not included in the processes in the vehicle control method.

The power saving mode (including the first power saving mode and the second power saving mode) is shown by thin bands, and the normal mode is shown by thick bands, in the lifeline of each device in FIG. 5, FIG. 6. and FIG. 7. Note that while having no description in FIG. 5, FIG. 6, and FIG. 7, when an operation request is received from another vehicle device such as one of the first ECUs 3*a*, while operating in the power saving mode, each of the second ECUs 3*b* returns to the normal mode, and when the requested operation is completed, each of the second ECUs 3*b* shifts to the power saving mode.

First, a procedure of the processes from setting the vehicle 2 to the normal mode until setting the vehicle 2 to the transportation mode that is a specific operation mode will be described in accordance with the sequence diagram shown in FIG. 5.

In the sequence diagram shown in FIG. 5, a scene is assumed, as an example, in a manufacturing plant or maintenance factory of the vehicle 2, the scene being where a worker shifts the vehicle 2 to the transportation mode. As an initial state of the vehicle 2, the SSSW 9 is turned off, the monitoring control device 4 and each of the second ECUs 3*b* are operating in the power saving mode, and each of the first ECUs 3*a* is operating in the first power saving mode. Moreover, in the vehicle 2, the vehicle diagnosis device 14 is connected to the DLC 12, and a supply of power to the vehicle diagnosis device 14 has been turned on.

In FIG. 5, first, when the worker turns on the SSSW 9 that is a power source switch of the vehicle 2 (P100), the first vehicle control unit 34 of the first ECU 3*a*-1 performs an activation process of the second battery 10*b* (S100). In this way, the second battery 10*b* starts a supply of power (S102), and the monitoring control device 4 and each of the first ECUs 3*a* start operation in the normal mode.

Next, when the worker inputs a transmission instruction of a shift instruction to the vehicle diagnosis device 14 (S102), the vehicle diagnosis device 14 transmits the shift instruction to the vehicle 2 (S104). As stated above, the shift instruction, in the present embodiment, is an instruction for the vehicle 2 to shift to a transportation mode, the transportation mode being a specific operation mode.

The instruction transmission unit 29 of the monitoring control device 4 receives the shift instruction, and the instruction transmission unit 29 transmits a transition instruction to each of the first ECUs 3*a* and each of the second ECUs 3*b*, based on the received shift instruction, the transition instruction for instructing a shift to the transportation mode (S104). In response to this, the first power source monitoring unit 35 of each of the first ECUs 3*a* and the second power source monitoring unit 45 of each of the second ECUs 3*b* transmit connection information to the monitoring control device 4 (S106). Next, the connection monitoring unit 25 of the monitoring control device 4 receives the connection information, and after the connection monitoring unit 25 confirms that each of the backup fuses 5 is mounted and all of the power supply lines 7 are in a connection state (S108), the connection monitoring unit 25 outputs a removal instruction, the removal instruction for instructing removal of each of the backup fuses 5 that are each an electric connector (or a non-connection instruction for instructing each of the electric connectors to be set to a non-connection state), from the HMI device 13 (S110). This removal instruction, such as stated above, can be an output of a text message or an output of a voice message, such as "please remove the backup fuses".

To continue, the mode setting unit 28 of the monitoring control device 4 sets the recording unit 27 to the second operation mode (S112). In this way, the recording unit 27 stops the execution of a recording operation of a fault diagnosis result. Moreover, the monitoring control device 4 shifts to the transportation mode, by having the recording unit 27 set to the second operation mode by the mode setting unit 28.

In response to the removal instruction being output in step S110, the worker turns the SSSW 9 off, in order for the worker to perform removal of each of the backup fuses 5 (P106). In response to the SSSW 9 being turned off, the first vehicle control unit 34 of the first ECU 3*a*-1 executes a stop process for the second battery 10*b* (S114).

In this way, the second battery 10*b* stops a supply of power (S116). In response to a supply of power from the second battery 10*b* being stopped, the monitoring control device 4 shifts to the power saving mode (S118), and the first ECU 3*a* shifts to the second power saving mode (S120, S122). Afterwards, when the worker removes each of the backup fuses 5 in step P108 (namely, when the worker sets each of the electric connectors to a non-connection state), each of the second ECUs 3*b* stops operation, by having a supply of power from each of the power supply lines 7 cut off. In this way, the entire vehicle 2 shifts from the normal mode to the transportation mode.

Next, a procedure of the processes of a vehicle control method in the vehicle control system 1, in the case where a worker such as a transportation staff turns on the SSSW 9, in the transportation mode that is a specific operation mode, will be described in accordance with the sequence diagram shown in FIG. 6.

When the worker turns on the SSSW 9 in the transportation mode (P200), the first vehicle control unit 34 of the first ECU 3*a*-1 performs an activation process of the second battery 10*b* (S200). In this way, the second battery 10*b* starts a supply of power (S202), and the monitoring control device 4 and each of the first ECUs 3*a* start operation in the normal mode.

Since the first power source monitoring unit 35 of each of the first ECUs 3*a* starting operation in the normal mode still does not receive a release instruction after receiving the transition instruction in step S104 of FIG. 5, the first power source monitoring unit 35 performs a determination of mounting presence/absence of each of the backup fuses 5 in each of the power supply lines 7 connected to each of the first ECUs 3*a*, and the first power source monitoring unit 35 transmits a connection instruction showing this determination result to the monitoring control device 4 (S204). Next, the connection monitoring unit 25 of the monitoring control device 4 confirms that all of the backup fuses 5 are removed, and all of the power supply lines 7 are in a non-connection state, based on the connection information and a voltage value of each of the power supply lines 7 of each of the second ECUs 3*b* acquired through each of the protective resistors R (S206).

In response to the connection monitoring unit 25 confirming that all of the backup fuses are removed and all of the power supply lines 7 are in a non-connection state, the HMI control unit 26 of the monitoring control device 4 outputs a specific mode execution notification to the HMI device 13, the specific mode execution notification for showing that the vehicle 2 is operating in the specific operation mode (S208). As stated above, the specific mode execution notification can be a display of a text message or an output of a voice message, such as "in a transportation mode", from the touch panel that is the HMI device 13 and/or the speaker that is the HMI device 13.

In response to the specific mode execution notification being output, the worker turns off the SSSW 9 (P202). In response to the SSSW 9 being turned off, the first vehicle control unit 34 of the first ECU 3*a*-1 executes a stop process for the second battery 10*b* (S210). In this way, the second battery 10*b* stops a supply of power (S212). Moreover, in response to a supply of power from the second battery 10*b* being stopped, the monitoring control device 4 shifts to the power saving mode (S214), and each of the first ECUs 3*a* shifts to the second power saving mode (S216, S218).

Next, a procedure of the processes of a vehicle control method, in which the vehicle 2 returns to the normal mode from the transportation mode that is a specific operation mode, will be described in accordance with the sequence diagram shown in FIG. 7.

In the sequence diagram shown in FIG. 7, a scene is assumed, as an example, in which the transported vehicle 2 is in a maintenance factory or a vehicle sales shop, the scene being where a worker shifts the vehicle 2 to the normal mode.

In FIG. 7, first, in step P300, the worker mounts each of the backup fuses 5 to each of the power supply lines 7 of the vehicle 2 (namely, sets each of the electric connectors to a connection state), in order for the vehicle 2 to return to the normal mode. In this way, the each of second ECUs 3*b* has a supply of power from each of the power supply lines 7 returned, and each of the second ECUs 3*b* starts operation in the power saving mode.

Next, when the SSSW 9 of the vehicle 2 is turned on (P302), in response to the SSSW 9 being turned on, the first vehicle control unit 34 of the first ECU 3*a*-1 executes an activation process for the second battery 10*b* (S300). The second battery 10*b* starts a supply of power (S302), and the monitoring control device 4 and each of the first ECUs 3*a* start operation in the normal mode.

Since the first power source monitoring unit 35 of each of the first ECUs 3*a* starting operation in the normal mode still does not receive a release instruction after receiving the transition instruction in step S104 of FIG. 5, the first power source monitoring unit 35 performs a determination of mounting presence/absence of each of the backup fuses 5 in each of the power supply lines 7 connected to each of the first ECUs 3*a*, and the first power source monitoring unit 35 transmits a connection instruction showing this determination result to the monitoring control device 4 (S304). Next, the connection monitoring unit 25 of the monitoring control device 4 confirms that all of the backup fuses 5 are removed, and all of the power supply lines 7 are in a connection state, based on the connection information and a voltage value of each of the power supply lines 7 of each of the second ECUs 3*b* acquired through each of the protective resistors R (S306).

In response to the connection monitoring unit 25 confirming that all of the backup fuses are removed and all of the power supply lines 7 are in a connection state, the HMI control unit 26 of the monitoring control device 4 outputs a message of an acknowledge request by the HMI device 13, the acknowledge request being an inquiry as to whether or not the transportation mode may end (S308). As stated above, the message of the acknowledgement request can be a display of a text message or an output of a voice message, such as "is it ok to finish the transportation mode?", from the touch panel that is the HMI device 13 or the speaker that is the HMI device 13.

In response to the message of the acknowledgement request being output from the HMI device 13, the worker performs an acknowledgement input by the HMI device 13 (P304). As stated above, the acknowledgement input can be a touch operation to the touch panel that is the HMI device 13 and/or the acknowledgement input can be a voice instruction received from the microphone that is the HMI device 13.

Afterwards, the HMI control unit 26 of the monitoring control device 4 receives the acknowledgement input through the HMI device 13 (S310). In response to the acknowledgement input being received, the instruction transmission unit 29 of the monitoring control device 4 transmits a release instruction to each of the electronic control devices 3, the release instruction for instructing a release of the transition instruction (S312), and the mode setting unit 28 sets the recording unit 27 to the first operation mode (S314). In this way, the recording unit 27 starts an execution of a recording operation of a fault diagnosis result. Moreover, the monitoring control device 4 returns to the normal mode, by having the recording unit 27 set to the first operation mode, and the entire vehicle 2 shifts to the normal mode.

Afterwards, when the worker turns off the SSSW 9 (P306), the first vehicle control unit 34 of the first ECU 3*a*-1 executes a stop process for the second battery 10*b* (S316), and the second battery 10*b* stops a supply of power (S318). Then, in response to a supply of power from the second battery 10*b* being stopped, the monitoring control device 4 shifts to the power saving mode (S320), and each of the first ECUs 3*a* shifts to the second power saving mode (S322, S324). Afterwards, the vehicle 2 continues to operate in the normal mode, until the vehicle 2 receives the next shift instruction from the vehicle diagnosis device 14.

OTHER EMBODIMENTS

In the above-stated embodiment, each of the backup fuses 5 attachably and detachably provided on each of the power supply lines 7 has been described, as an example of each of the electric connectors provided between each of the power supply lines 7 and each of the plurality of electronic control devices, each of the power supply lines 7 for constantly performing a supply of power, and each of the electric connectors for selectively setting an electronic connection of each of the power supply lines 7 to a connection state or a non-connection state. However, each of the electric connectors is not limited to a fuse.

Each of the electric connectors can be an arbitrary device and/or a device capable of selectively setting a connection/non-connection of each of the power supply lines 7 by a prescribed operation (including a manual operation, remote operation, transmission of a switching instruction through a prescribed device, energization or the like).

Such an electric connector may be a jumper wire or a jumper pin attachably and detachably provided on each of the power supply lines 7, the jumper wire or the jumper pin capable of setting a connection/non-connection by being inserted or pulled out by a person. Moreover, each of the electric connectors can be a self-holding physical switch or a relay capable of selectively setting a connection/non-connection by a setting instruction or energization, by a manual operation or through a prescribed device.

Note that the present invention is not limited to the configurations of the embodiments described above, and the present invention can be implemented in various modes in a range that does not deviate from the content of the present invention.

[Configurations Supported by the Embodiments]

The above-stated embodiments support the following configurations.

(Configuration 1)

A vehicle control system that includes a plurality of electronic control devices each for controlling an operation of a vehicle, the plurality of electronic control devices each being mounted in the vehicle, a monitoring control device for monitoring an operation of each of the electronic control devices, and an electric connector for selectively setting an electronic connection of a power source line for constantly performing a supply of power to a connection state or a non-connection state, the electric connector being provided between the power source line and each of the plurality of electronic control devices, the monitoring control device includes a recording unit for performing a fault diagnosis of one of the electronic control devices being a monitoring target, the recording unit for executing a recording operation to store a diagnosis result in a storage device, and a mode setting unit for setting the recording unit to a first operation mode or a second operation mode, the first operation mode for executing the recording operation and the second operation mode for not executing the recording operation.

According to the vehicle control system of Configuration 1, at the time of vehicle transportation, for example, power consumption in the vehicle can be suppressed, and an incorrect fault diagnosis result for an electronic control device can be prevented from being recorded along with the suppression of power consumption.

(Configuration 2)

The vehicle control system described in Configuration 1, in which when a shift instruction is received from an external device, the shift instruction for instructing the vehicle to shift to a prescribed specific operation mode, the monitoring control device sets the recording unit to the second operation mode by the mode setting unit, and the monitoring control device shifts to the specific operation mode.

According to the vehicle control system of Configuration 2, an incorrect fault diagnosis result at the time of transportation or the like can be easily prevented from being recorded, by an instruction from an external device such as a vehicle diagnosis device.

(Configuration 3)

The vehicle control system described in Configuration 2, in which the monitoring control device includes an instruction transmission unit, when receiving the shift instruction from the external device, for transmitting a transition instruction to each of the electronic control devices, the transition instruction showing the fact that the vehicle has been instructed to shift to the specific operation mode, a connection monitoring unit for monitoring whether or not each of the power source lines are in a connection state by the electric connector, and an HMI control unit for controlling an HMI device mounted in the vehicle, in a case where a power source switch of the vehicle has been turned on during a time period when the monitoring control device is shifting to the specific operation mode, and when the connection monitoring unit determines that all of the power source lines are in a non-connection state by the electric connector, the HMI control unit outputs a notification to inside the vehicle by the HMI device, the notification being the fact that the vehicle is operating in the specific operation mode.

According to the vehicle control system of Configuration 3, a vehicle transportation worker or the like can easily know that the vehicle is in a specific operation mode, the specific operation mode being the fact that each of the electric connectors are set to a non-connection state (for example, each of the backup fuses are removed), power consumption is reduced, and a fault diagnosis result is not recorded.

(Configuration 4)

The vehicle control system described in Configuration 3, in which in a case where a power source switch of the vehicle has been turned on during a time period when the monitoring control device is shifting to the specific operation mode, and when the connection monitoring unit determines that all of the power source lines are in a connection state by the electric connector, the mode setting unit sets the recording unit to the first operation mode, and the instruction transmission unit transmits a release instruction to each of the electronic control devices, the release instruction for instructing a release of the transition instruction.

According to the vehicle control system of Configuration 4, after vehicle transportation has finished, for example, the vehicle can be automatically returned to a normal operation mode, by setting all of the electric connectors to a connection state (for example, attaching all of the backup fuses), and turning on the vehicle power source switch. Therefore, the work becomes easy.

(Configuration 5)

The vehicle control system described in Configuration 3, in which in a case where a power source switch of the vehicle has been turned on during a time period when the monitoring control device is shifting to the specific operation mode, and when the connection monitoring unit determines that all of the power source lines are in a connection state by the electric connector, the HMI control unit waits for an acknowledgement input to be received through the HMI device, the acknowledgement input for ending the specific operation mode, and in response to the acknowledgement input being received through the HMI device, the mode setting unit sets the recording unit to the first operation mode, and the instruction transmission unit transmits a release notification of the transition instruction to the electronic control device.

According to the vehicle control system of Configuration 5, the vehicle does not return to the normal mode, for example, until a vehicle maintenance staff or the like performs an acknowledgement input. Therefore, the vehicle can be prevented from carelessly returning to the normal mode before maintenance after transportation or the like is completed.

(Configuration 6)

The vehicle control system described in any of Configurations 1 to 5, in which each of the plurality of electronic control devices includes a first electronic control device for receiving a supply of power from a power supply line directly wired to the power source line without intervention of the electric connector, the first electronic control device for continuing an operation in a power saving mode after the electric connector sets the power source line to a non-connection state, and a second electronic control device, when the electric connector sets the power source line to a non-connection state, being in a non-operation state by losing a supply of power.

According to the vehicle control system of Configuration 6, by the fact that there is the first electronic control device, after all of the electric connectors are set to a non-connection state, (for example, after all of the backup fuses are removed), an operation performed for the vehicle, such as turning on/off the vehicle power source switch, for example, can be detected, and a countermeasure operation can be performed.

(Configuration 7)

The vehicle control system described in Configuration 6, in which the monitoring control device includes an instruction transmission unit, when receiving a shift instruction from an external device, the shift instruction for instructing the vehicle to shift to a prescribed specific operation mode, for transmitting a transition instruction to the electronic control device, the transition instruction showing the fact that the vehicle has been instructed to shift to the specific operation mode, the first electronic control device includes an operation setting unit for setting an operation mode of the first electronic control device, when a power source switch of the vehicle has been turned off when not receiving the transition instruction or when the transition instruction is released, the operation setting unit sets the first electronic control device to a first power saving mode, and when the power source switch has been turned off from when receiving the transition instruction until the transition instruction is released, the operation setting unit sets the first electronic control device to a second power saving mode with a lower power consumption than power consumption of the first power saving mode.

According to the vehicle control system of Configuration 7, when each of the electric connectors is set to a non-connection state, power consumption, in a power saving mode, of the first electronic control device capable of operating after each of the electric connectors is set to a non-connection state, is reduced more than power consumption when each of the electric connectors is set to a non-connection state. Therefore, power consumption of the vehicle can be reduced in the specific operation mode.

(Configuration 8)

A vehicle control method executed by a vehicle control system including a plurality of electronic control devices each for controlling an operation of a vehicle, the plurality of electronic control devices each being mounted in the vehicle, a monitoring control device for monitoring an operation of each of the electronic control devices, and an electric connector for selectively setting an electronic connection of a power source line for constantly performing a supply of power to a connection state or a non-connection state, the electric connector being provided between the power source line and each of the plurality of electronic control devices, the vehicle control method including a step performed by a computer included in the monitoring control device, the step for setting a recording unit to a first operation mode or a second operation mode, the recording unit for performing a fault diagnosis of one of the electronic control devices being a monitoring target, the recording unit for executing a recording operation to store a diagnosis result in a storage device, and the first operation mode for executing the recording operation and the second operation mode for not executing the recording operation.

According to the vehicle control method of Configuration 8, at the time of vehicle transportation, for example, power consumption in the vehicle can be suppressed and an incorrect fault diagnosis result for an electronic control device can be prevented from being recorded along with the suppression of power consumption.

REFERENCE SIGNS LIST

1 vehicle control system
2 vehicle
3 electronic control device
3*a*, 3*a*-1, 3*a*-2 first ECU (first electronic control device)
3*b*, 3*b*-1, 3*b*-2, 3*b*-3, 3*b*-4, 3*b*-5, 3*b*-6 second ECU (second electronic control device)
4 monitoring control device
5, 5*a*, 5*b*, 5*c*, 5*d*, 5*e*, 5*f*, 5*g*, 5*h* backup fuse
6*a*, 6*b* power source line
7, 7*a*, 7*b*, 7*c, d*, 7*e*, 7*f*, 7*g*, 7*h*, 8, 8*a*, 8*b* power supply line
9 SSSW (power source switch)
10*a* first battery
10*b* second battery
11 communication bus
12 DLC
13 HMI device
14 vehicle diagnosis device
20 first processor
21 first memory
22 first communicator
23 fault record
24 first program
25 connection monitoring unit
26 HMI control unit
27 recording unit
28 mode setting unit
29 instruction transmission unit
30 second processor
31 second memory
32 second communicator
33 second program
34 first vehicle control unit
35 first power source monitoring unit
36 operation setting unit
40 third processor
41 third memory
42 third communicator
43 third program
44 second vehicle control unit
45 second power source monitoring unit

What is claimed is:

1. A vehicle control system, comprising:

a plurality of electronic control devices each for controlling an operation of a vehicle, the plurality of electronic control devices each being mounted in the vehicle;

a monitoring control device for monitoring an operation of each of the electronic control devices; and an electric connector for selectively setting an electronic connection of a power source line for constantly performing a supply of power to a connection state or a non-connection state, the electric connector being provided between the power source line and each of the plurality of electronic control devices, wherein the monitoring control device comprises a first processor that includes a recording unit for performing a fault diagnosis of one of the electronic control devices being a monitoring target, the recording unit for executing a recording operation to store a diagnosis result in a storage device, and a mode setting unit for setting the recording unit to a first operation mode or a second operation mode, the first operation mode for executing the recording operation and the second operation mode for not executing the recording operation, and when a shift instruction is received from an external device, the shift instruction for instructing the vehicle to shift to a prescribed specific operation mode, the first processor of the monitoring control device sets the recording unit to the second operation mode by the mode setting unit, and the monitoring control device shifts to the specific operation mode.

2. The vehicle control system according to claim 1, wherein the first processor of the monitoring control device comprises an instruction transmission unit, when receiving the shift instruction from the external device, for transmitting a transition instruction to each of the electronic control devices, the transition instruction showing the fact that the vehicle has been instructed to shift to the specific operation mode, a connection monitoring unit for monitoring whether or not each of the power source lines are in a connection state by the electric connector; and a human-machine interface (HMI) control unit for controlling an HMI device mounted in the vehicle, wherein in a case where a power source switch of the vehicle has been turned on during a time period when the monitoring control device is shifting to the specific operation mode, and when the connection monitoring unit determines that all of the power source lines are in a non-connection state by the electric connector, the HMI control unit outputs a notification to inside the vehicle by the HMI device, the notification being the fact that the vehicle is operating in the specific operation mode.

3. The vehicle control system according to claim 2, wherein in a case where a power source switch of the vehicle has been turned on during a time period when the monitoring control device is shifting to the specific operation mode, and when the connection monitoring unit determines that all of the power source lines are in a connection state by the electric connector, the mode setting unit sets the recording unit to the first operation mode, and the instruction transmission unit transmits a release instruction to each of the electronic control devices, the release instruction for instructing a release of the transition instruction.

4. The vehicle control system according to claim 2, wherein in a case where a power source switch of the vehicle has been turned on during a time period when the monitoring control device is shifting to the specific operation mode, and when the connection monitoring unit determines that all of the power source lines are in a connection state by the electric connector, the HMI control unit waits for an acknowledgement input to be received through the HMI device, the acknowledgement input for ending the specific operation mode, and in response to the acknowledgement input being received through the HMI device, the mode setting unit sets the recording unit to the first operation mode, and the instruction transmission unit transmits a release notification of the transition instruction to the electronic control device being the monitoring target.

5. The vehicle control system according to claim 1, wherein each of the plurality of electronic control devices includes a first electronic control device for receiving a supply of power from a power supply line directly wired to the power source line without intervention of the electric connector, the first electronic control device for continuing an operation in a power saving mode after the electric connector sets the power source line to a non-connection state, and a second electronic control device, when the electric connector sets the power source line to a non-connection state, being in a non-operation state by losing a supply of power.

6. The vehicle control system according to claim 5, wherein the first processor of the monitoring control device comprises an instruction transmission unit, when receiving a shift instruction from an external device, the shift instruction for instructing the vehicle to shift to a prescribed specific operation mode, for transmitting a transition instruction to the electronic control device being the monitoring target, the transition instruction showing the fact that the vehicle has been instructed to shift to the specific operation mode, the first electronic control device comprises a second processor that includes an operation setting unit for setting an operation mode of the first electronic control device, when a power source switch of the vehicle has been turned off when not receiving the transition instruction, or when the transition instruction is released, the operation setting unit sets the first electronic control device to a first power saving mode, and when the power source switch has been turned off from when receiving the transition instruction until the transition instruction is released, the operation setting unit sets the first electronic control device to a second power saving mode with a lower power consumption than power consumption of the first power saving mode.

7. A vehicle control method executed by a vehicle control system comprising a plurality of electronic control devices each for controlling an operation of a vehicle, the plurality of electronic control devices each being mounted in the vehicle, a monitoring control device for monitoring an operation of each of the electronic control devices, and an electric connector for selectively setting an electronic connection of a power source line for constantly performing a supply of power to a connection state or a non-connection state, the electric connector being provided between the power source line and each of the plurality of electronic control devices, the vehicle control method comprising:

a step performed by a computer included in the monitoring control device, the step for setting a recording unit to a first operation mode or a second operation mode, the recording unit for performing a fault diagnosis of one of the electronic control devices being a monitoring target, the recording unit for executing a recording operation to store a diagnosis result in a storage device, and the first operation mode for executing the recording operation and the second operation mode for not executing the recording operation, and when a shift instruction is received from an external device, the shift instruction for instructing the vehicle to shift to a prescribed specific operation mode, the monitoring control device sets the recording unit to the second operation mode by the mode setting unit, and the monitoring control device shifts to the specific operation mode.

8. A vehicle control system, comprising:

a plurality of electronic control devices each for controlling an operation of a vehicle, the plurality of electronic control devices each being mounted in the vehicle;

a monitoring control device for monitoring an operation of each of the electronic control devices; and an electric connector for selectively setting an electronic connection of a power source line for constantly performing a supply of power to a connection state or a non-connection state, the electric connector being provided between the power source line and each of the plurality of electronic control devices, wherein the monitoring control device comprises a first processor that includes a recording unit for performing a fault diagnosis of one of the electronic control devices being a monitoring target, the recording unit for executing a recording operation to store a diagnosis result in a storage device, and a mode setting unit for setting the recording unit to a first operation mode or a second operation mode, the first operation mode for executing the recording operation and the second operation mode for not executing the recording operation, each of the plurality of electronic control devices includes a first electronic control device for receiving a supply of power from a power supply line directly wired to the power source line without intervention of the electric connector, the first electronic control device for continuing an operation in a power saving mode after the electric connector sets the power source line to a non-connection state, and a second electronic control device, when the electric connector sets the power source line to a non-connection state, being in a non-operation state by losing a supply of power.

* * * * *